United States Patent Office 2,749,375
Patented June 5, 1956

2,749,375

FLUORINATION OF METHYLENE HALIDES

Robert P. Ruh and Ralph A. Davis, Midland, Mich., assignors to The Dow Chemical Company, Midland, Mich., a corporation of Delaware No Drawing. Application February 24, 1950,
Serial No. 146,142

4 Claims. (Cl. 260—653)

This invention relates to the fluorination of methylene halides, and, more particularly, to the production of methylene fluoride by the fluorination of methylene halides.

Methylene fluoride is an important organic intermediate, for example, for the production of bromodifluoromethane and dibromodifluoromethane. Preliminary tests indicate that both of these compounds have effectiveness of the order of that of the most effective previously known fire extinguishers, but have a great advantage over these compounds of being relatively non-toxic to warm blooded animals. Both of these materials are produced readily by vapor-phase bromination of methylene fluoride. It was known, prior to our invention, to be possible to produce methylene fluoride from methylene chloride by the action thereon of a fluorine-containing antimony halide. As early as 1892 Swartz (Bull. Acad. Roy. Belg. 24, 474) disclosed the use of a pentavalent antimony halide to catalyze a similar reaction. However, it has not been known to produce methylene fluoride in high conversions. For example, if methylene chloride is subjected, at atmospheric pressure, to the action of antimony fluoride at a temperature of about 60° C., the reaction products contain about 5.5 mol per cent of methylene fluoride and about 26 mol per cent of methylene chlorofluoride, the remainder being substantially pure methylene chloride. Similarly, if such a reaction is carried out at a temperature between about 125° C. and about 130° C. and at a pressure between about 100 and about 125 pounds per square inch gauge, the reaction products contain about 11.1 mol per cent of methylene fluoride and about 11 mol per cent of methylene chlorofluoride. These conversions are too low for commercial exploitation of the reaction, and it is not known to be economically feasible to improve the conversion by recycling. Our application entitled "Production of Methylene Fluoride," filed concurrently herewith, teaches that methylene fluoride can be produced from methylene halides in greatly improved conversions if certain variables are controlled within prescribed critical limits; the present invention is an improvement thereover based upon the discovery of a critical relationship between the conversion to methylene fluoride and the fluorine-containing antimony halide employed as the fluorinating agent.

The principal object of the present invention is to provide an improved method for producing methylene fluoride from methylene halides by the action of a fluorine-containing antimony halide. More specific objects and advantages are apparent from the description, which illustrates and discloses, but is not intended to limit the invention.

According to the invention methylene fluoride is produced from a mixture of one mol of methylene chloride, methylene bromochloride, or methylene bromide with from two to three mols of hydrogen fluoride by the action thereon of a fluorine-containing antimony halide. At least 5 per cent of the antimony of the fluorine-containing antimony halide is in the pentavalent form, and at least 80 per cent of the halogen atoms thereof are fluorine; the mol ratio of antimony to methylene halide is from 0.2:1 to 2:1. The reaction is carried out in a closed vessel from which only vapors are withdrawn, and only through a fractionating column open thereto. The material condensed in the fractionating column is returned to the reactor. During the reaction the following variables are regulated: (1) the rate of withdrawal of fractionating column heads, (2) the rate of withdrawal of heat from the fractionating column, and (3) the rate at which heat is supplied to the reactor, so as to maintain the reactor at a temperature between 110° C. and 175° C. and at a pressure in pounds per square inch gauge, $p$, such that there is a liquid-phase methylene halide and liquid-phase hydrogen fluoride in the reactor, and such that the $\log_{10}$ of the temperature in degrees C. of the fractionating column heads is less than $0.54 \log_{10} p + 0.215$.

The method of the invention is applicable to the fluorination of methylene halides having a molecular weight between 84 and 174. This includes methylene chloride, methylene bromochloride and methylene bromide, methylene chloride being the preferred methylene halide, for economic reasons. It is an essential feature of the method of the invention that the mixture of the methylene halide and hydrogen fluoride be subjected in the liquid-phase to the action of a fluorine-containing antimony halide.

As is hereinbefore indicated, the fluorinating agent is a fluorine-containing antimony halide. The fluorination can be accomplished batchwise (by charging the fluorine-containing antimony halide, hydrogen fluoride and the methylene halide to the reactor), or continuously (by passing a mixture of hydrogen fluoride and methylene halide through a reactor containing the antimony halide). When the fluorination is accomplished batchwise by charging the methylene halide, the antimony halide and hydrogen fluoride, it is advantageous that the mol ratio of antimony to methylene halide be between 0.2:1 and 1:1, and preferred that it be between 0.25:1 and 0.75:1. When an antimony halide, hydrogen fluoride and a methylene halide are reacted by a continuous method, it is advantageous that the ratio of antimony to methylene halide be from 0.2:1 to 2:1; it is preferred that it be from 0.25:1 to 0.75:1.

Although it is possible to effect fluorination in the absence of hydrogen fluoride (by the action on a methylene halide of a fluorine-containing antimony halide, alone) it is usually desirable that sufficient hydrogen fluoride be employed to convert all of the methylene halide charged to methylene fluoride; ordinarily there is no reason to use more than a 50 per cent excess of hydrogen fluoride (i. e., it is usually desired that the mol ratio of hydrogen fluoride to methylene halide be from 2:1 to 3:1).

It has been found to be essential that at least 5 per cent of the antimony halide be present in the pentavalent form. The reaction proceeds if all the antimony is in the pentavalent form. If the antimony compound available contains less than 5 per cent of pentavalent antimony, a charge of chlorine or bromine is admitted to the reactor in order to convert the desired amount of antimony to its pentavalent form. This charge can be added with the methylene halide and hydrogen fluoride; the conversion to the pentavalent form takes place either before or concurrently with fluorination. Alternatively, the catalyst can be converted in a separate step, but this is usually economically disadvantageous.

As has been hereinbefore indicated, the reaction is carried out so that log $t$ is less than $0.54 \log p + 0.215$, where $t$ is the temperature in degrees C. of the fractionating column heads. When the reaction is run batchwise it is essential that the pressure in the reactor accumulate to at least about 400 pounds per square inch gauge before any product is removed from the reactor, and preferred that it accumulate to at least about 500 pounds per square inch gauge. Such a pressure is ordinarily reached when the reactor temperature is within the range, hereinbefore indicated, in which fluorination takes place, and is sufficient to maintain at least a part of the methylene halide and hydrogen fluoride in the liquid phase. Ordinarily there is no reason to allow the pressure to accumulate to more than about 800 pounds per square inch gauge before taking off the product and it is usually preferred not to allow the pressure to accumulate to more than about 700 pounds per square inch gauge. As a batchwise reaction proceeds the pressure in the reactor gradually decreases due to the removal therefrom of reaction products. As the pressure in the reactor decreases, however, the fractionating column head temperature can be decreased without increasing the amount of cooling agent circulated therethrough. When the reaction is conducted continuously the optimum reactor pressure is determined by the same factors that control when the reaction is conducted batchwise. Accordingly, it is advantageous to allow the pressure to accumulate as indicated above after charging a methylene halide and HF to the reactor.

It has been found to be practical to the fractionating column to a temperature as high as about 10° C., using ordinary water as the cooling agent. When water is the cooling agent, and a temperature between 10° C. and slightly above 0° C. is employed, it is feasible to use a fractionating column head temperature ranging from a maximum of about 45° C. to a minimum of about 15° C. It is advantageous to use a refrigerated brine to cool the fractionating column to a temperature as low as about −20° C., particularly in the early stages of reaction; however, the use of a refrigerated brine is not essential, as satisfactory results can be achieved using ordinary water.

As has been hereinbefore indicated, reaction products leave the reactor through a fractionating column. It has been found that satisfactory results can be achieved when the fractionating column is merely a jacketed tube with a cooling agent circulated through the jacket. However, better results are possible if the fractionating column is more efficient, e. g., is packed, or has plates and caps. It is usually desired that the fractionating column be open to the reactor so that it is operated substantially at the pressure thereof; otherwise, the return of material condensed in the fractionating column is difficult, if not impossible, or reaction gases do not pass into the fractionating column. Since a pressure differential exists from the top to the bottom of any fractionating column, a small pressure difference between the top of the fractionating column and the reactor is essential.

The purity of the methylene fluoride recovered according to the process of the invention can be further increased by selective condensation of the gases produced. In this way it is feasible to recover methylene fluoride of greater than 95 mol per cent purity. Selective condensation is conveniently effected by passing the reaction vapors through a preliminary condenser cooled to a temperature between about −20° C. and about −30° C. in order to remove relatively higher boiling products from the gas stream. Methylene fluoride of sufficient purity for bromination to produce bromodifluoromethane and dibromodifluoromethane (as hereinbefore discussed) is then recovered in a condenser operated at a temperature sufficiently below the boiling point thereof to effect efficient condensation. The condenser is conveniently cooled by a solid carbon dioxide-acetone mixture which assumes a temperature of −78° C. This selective condensation is a preferred, but not an essential aspect of the invention.

The following example is intended to illustrate and disclose, but is not to be construed as limiting, the invention:

EXAMPLE

Methylene fluoride was produced from a methylene halide having a molecular weight between 84 and 174, by the action of a fluorine-containing antimony halide, according to the following procedure:

An 8.5 gallon autoclave fitted with a jacketed open tube fractionating column was charged with antimony trichloride (25.2 pounds) and anhydrous hydrogen fluoride (6 pounds), and the autoclave was heated to 115° C. to convert the antimony trichloride to antimony trifluoride. Unreacted hydrogen fluoride was distilled from the reactor. Methylene chloride (38 pounds), anhydrogen fluoride (21 pounds) and chlorine (1 pound) were then charged to the autoclave, and external heating thereof was started. When the temperature of the autoclave was 122° C. (two hours after heating had started) circulation of water (between 0° C. and 10° C.) through the fractionating column jacket was started; removal of reaction products from the top of the fractionating column was then begun at a head temperature of 14.0° C. Reaction products were passed through a water scrubber and through an alkaline scrubber containing a solution of about 10 weight per cent of caustic, and then through a train of three condensers, the first of which was operated at −20° C., and the second two of which were operated at −78° C. Removal of reaction products was continued; the time in hours after the start of product removal, the autoclave temperature in degrees C., the autoclave pressure in pounds per square inch gauge, the log of the autoclave pressure, the fractionating column head temperature in degrees C., and the log of the fractionating column head temperature through the period of product removal from the autoclave are shown in the table, below:

Table

| Time in hrs. after start of product removal | Autoclave temperature in ° C. | Autoclave pressure, lbs./sq. in. gauge | Log₁₀ | Fractionating column head temperature in ° C. | Log₁₀ |
| --- | --- | --- | --- | --- | --- |
| 1 | 130 | 625 | 2.7959 | 28 | 1.4472 |
| 2 | 131 | 615 | 2.7884 | 38 | 1.5798 |
| 3 | 131 | 620 | 2.7924 | 38 | 1.5798 |
| 5 | 134 | 660 | 2.8195 | 48.5 | 1.6857 |
| 6 | 136 | 675 | 2.8293 | 49.5 | 1.6946 |
| 7 | 136 | 665 | 2.8228 | 48.0 | 1.6812 |
| 8 | 135 | 635 | 2.8028 | 45.0 | 1.6532 |
| 9 | 136 | 625 | 2.7959 | 43.5 | 1.6385 |
| 10 | 132 | 565 | 2.7520 | 41.0 | 1.6128 |
| 11 | 132 | 560 | 2.7482 | 39.5 | 1.5966 |
| 12 | 137 | 400 | 2.6021 | 38.0 | 1.5798 |
| 13 | 147 | 140 | 2.1461 | 18.5 | 1.2672 |
| 14 | 145 | 50 | 1.6990 | 14.0 | 1.1461 |

It is readily determined that the head temperature and autoclave pressures given above are within the operable range hereinbefore defined. Removal of products was then discontinued; the autoclave was allowed to cool to room temperature; and methylene chloride (0.1 pound) was recovered therefrom. The product cooled in the first condenser (−20° C.) amounted to ¼ pound; that in the second amounted to 22.3 pounds; and that in the third amounted to ½ pound. The material in the second condenser was 95.3 mol per cent methylene fluoride. The total recovery amounted to 21.1 pounds of methylene fluoride, ½ pound of methylene chlorofluoride and 1½ pounds of unreacted methylene chloride. This is a total conversion of methylene chloride to methylene fluoride of 91 mol per cent.

If a fluorine-containing antimony halide less than 80 per cent of whose halogens are fluorine is employed to carry out a reaction otherwise similar to that described in the preceding example, it is not known to be possible to achieve more than an 83 per cent conversion of the methylene halide charged to methylene fluoride.

We claim:

1. An improved method of producing methylene fluoride that comprises heating together in a closed zone at a temperature maintained between 110° and 175° C. under autogenous pressure a mixture essentially comprising one molar proportion of a methylene halide having a molecular weight between 84 and 174, from two to three molar proportions of hydrogen fluoride, and a fluorine-containing antimony halide of which at least 5 per cent of the antimony is in the pentavalent form and at least 80 per cent of the halogen atoms of which are fluorine, passing vapors from the zone into a superposed openly-communicating reflux fractionating zone cooled by indirect heat transfer to a temperature $t$ (in degrees centigrade) between 15° and 45° C. into countercurrent contact with condensate forming therein and refluxing to the heating zone, bleeding uncondensed vapor from the top of the fractionating zone at a rate such as to maintain the autogenous pressure $p$ (in pounds per square inch gauge) in the heating zone at a value sufficiently high to maintain methylene halide therein in the liquid phase and to satisfy the relation $\log t < 0.54 \log p + 0.215$, and recovering methylene fluoride from the vapor thus bled from the system.

2. An improved method of producing methylene fluoride that comprises heating together in a closed zone at a temperature maintained between 115° and 150° C. and under autogenous pressure a mixture of hydrogen fluoride, a methylene halide having a molecular weight between 84 and 174, and a fluorine-containing antimony halide of which at least 5 per cent of the antimony is in the pentavalent form and at least 80 per cent of the halogen atoms of which are fluorine, the said reactants being in such proportions that the mol ratio of antimony to methylene fluoride is from 0.2:1 to 2:1 and that the ratio of total atoms of fluorine to molecules of methylene halide is between 2:1 and 3:1, passing vapors from the zone into a superposed openly-communicating reflux fractionating zone cooled by indirect heat-transfer to a temperature $t$ (in degrees centigrade) between 15° and 45° C. into countercurrent contact with condensate forming therein and refluxing to the heating zone, bleeding uncondensed vapor from the top of the fractionating zone at a rate such as to maintain the autogenous pressure $p$ (in pounds per square inch gauge) in the heating zone at a value sufficiently high to maintain liquid phase methylene halide and hydrogen fluoride therein and to satisfy the relation $\log t < 0.54 \log p + 0.215$, and recovering methylene fluoride from the vapor thus bled from the system.

3. A method according to claim 2 in which the methylene halide is methylene chloride and the mol ratio of antimony thereto is between 0.25:1 and 0.75:1.

4. An improved method of producing methylene fluoride that comprises heating together in a closed zone at a temperature maintained between 110° and 175° C. under autogenous pressure a mixture essentially comprising one molar proportion of methylene chloride, from two to three molar proportions of hydrogen fluoride, and a fluorine-containing antimony halide of which at least 5 per cent of the antimony is in the pentavalent form and at least 80 per cent of the halogen atoms of which are fluorine, passing vapors from the zone into a superposed openly-communicating reflux fractionating zone, cooled by indirect heat-transfer to a temperature $t$ (in degrees centigrade) between 15° and 45° C. into countercurrent contact with condensate forming therein and returning to the zone, maintaining the system closed until autogenously developed pressure reaches at least 400 pounds per square inch gauge, thereafter bleeding uncondensed vapor from the top of the fractionating zone at a rate such as to maintain the autogenous pressure $p$ (in pounds per square inch gauge) at a value above 50 pounds sufficiently high to maintain methylene chloride therein in the liquid phase and to satisfy the relation $\log t < 0.54 \log p + 0.215$, and separating methylene fluoride from the vapor thus bled from the system.

References Cited in the file of this patent

UNITED STATES PATENTS

| | | |
|---|---|---|
| 2,005,711 | Daudt et al. | June 18, 1935 |
| 2,005,713 | Holt et al. | June 18, 1935 |
| 2,007,208 | Midgley et al. | July 9, 1935 |
| 2,013,062 | Midgley et al. | Sept. 3, 1935 |